April 17, 1956  L. E. PUCHER ET AL  2,742,520
BATTERY AND METHOD OF MANUFACTURE
Filed April 9, 1954

INVENTORS
LEO E. PUCHER
BY JOSEPH F. SZABO
Hudson, Boughton,
Williams, David & Hoffmann
ATTORNEYS

United States Patent Office 2,742,520
Patented Apr. 17, 1956

2,742,520

BATTERY AND METHOD OF MANUFACTURE

Leo E. Pucher, South Euclid, and Joseph F. Szabo, Lakewood, Ohio, assignors to The Electric Storage Battery Company, a corporation of New Jersey Application April 9, 1954, Serial No. 422,062

6 Claims. (Cl. 136—111)

The present invention relates to electric batteries and to a method of making the same.

One of the objects of the invention is the provision of a novel and improved method of manufacturing electric batteries by which the cells of the battery are expeditiously assembled in their proper relationship within a battery casing.

Another object of the present invention is the provision of a novel and improved method of manufacturing batteries in which the individual cells of the battery are interconnected to form a string with the plates of the cells transverse to the length of the string and inserted into an elongated compartment open at one end by longitudinal movement of the string of cells through the open end.

Another object of the present invention is the provision of a new and improved battery having cells which expand with use causing the electrolyte to collect at the bottom of the cell, the battery being so constructed and arranged that the danger of short-circuiting by collection of electrolyte is materially minimized.

Another object of the present invention is the provision of a new and improved battery comprised of a plurality of series-connected cells, and wherein each cell comprises positive and negative plates spaced by a separator and located within an impervious insulating container or bag, preferably of flexible plastic material.

Another object of the present invention is the provision of a novel and improved battery having a plurality of series-connected cells of the type which expand with use, the battery being so constructed and arranged that expansion spaces are provided for the cells.

A further object of the present invention is the provision of a battery comprised of a plurality of series-connected cells, the cells each comprising positive and negative plates spaced by an electrolyte absorbing separator and an individual bag or container for each cell comprised of an impervious insulating material, preferably flexible plastic, and being interconnected to form a string of cells with the plates of the cells transverse to the length of the string; and a casing having an elongated compartment for receiving the cells, portions of the compartment being arcuate whereby expansion spaces are provided between the cells located in the arcuate portions of the compartment.

A still further object of the present invention is the provision of a novel and improved battery unit comprised of two batteries within a single battery casing, the battery casing being so constructed and arranged that the first battery is located within a central compartment within the casing and the second battery comprised of a plurality of cells interconnected to form a string of cells with the plates of each cell transverse to the length of the string located in an elongated compartment between the central compartment and the outer side walls of the battery casing, the elongated compartment substantially encompassing the central compartment.

A further object of the present invention is the provision of a novel and improved battery unit comprised of two batteries supported within a single battery casing, the battery casing being so constructed and arranged that the first battery is located within a central compartment within the battery casing and the second battery comprised of a plurality of cells interconnected to form a string of cells with the plates of each cell transverse to the length of the string located in an elongated compartment between the central compartment and the outer side walls of the battery casing, the elongated compartment being provided with rounded corners intermediate its ends whereby expansion spaces are provided between the cells adjacent the rounded corners.

Another object of the present invention is the provision of a novel and improved battery unit having increased capacity and voltage rating per unit volume.

The invention resides in certain combinations and arrangements of method steps and parts, and further objects and advantages of the invention will be apparent to those skilled in the art to which it relates from the following description of the preferred embodiment described with reference to the accompanying drawings forming a part of this specification, in which.

Figure 1:
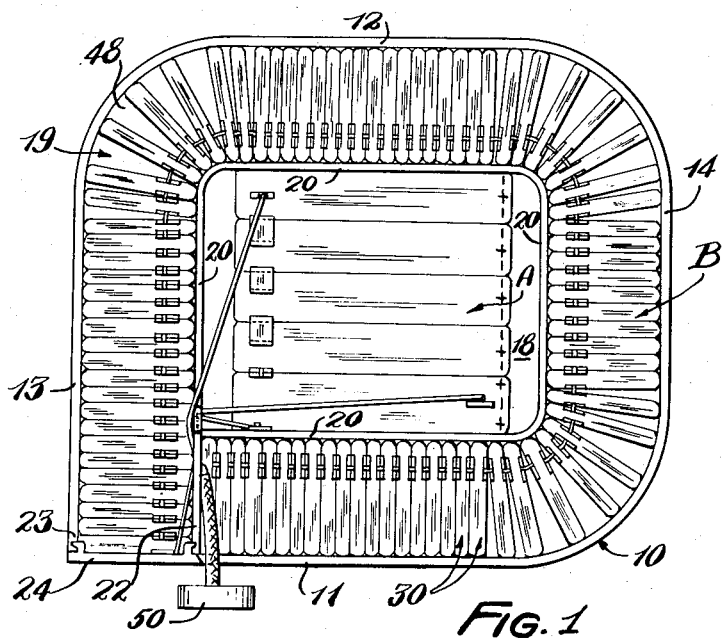
Fig. 1 is a general plan view of a battery embodying the present invention with the cover of the battery removed.

As previously stated, the invention contemplates the provision of a new and improved battery and battery unit and method of making the same. The battery unit contemplated by the present invention is particularly adapted for use with radio type, meteorological equipment, and includes an "A" battery designated generally by the reference character A, and a "B" battery designated generally by the reference character B.

As shown in Fig. 1, the "A" and "B" batteries are supported in a single two-piece battery casing C including an open-top base portion 10 having a front wall 11, back wall 12, and side walls 13, 14. The corners 15, 16, and 17 of the lower portion 10 formed by the intersection of the side wall 13 with the back wall 12, the back wall 12 with side wall 14, and the side wall 14 with the front wall 11, respectively, are rounded for reasons that will appear hereinafter.

The base portion 10 is divided into a central compartment 18 for receiving the "A" battery and an elongated compartment 19 encompassing the central compartment for receiving the "B" battery by means of interior walls 20 which are spaced from and substantially parallel to the outer walls of base portion 10. The interior wall 20 forming the left-hand side of the central compartment 18 has a portion 22 extending forwardly thereof to intersect the front wall 11 of the portion 10. One side of the portion 22 constitutes one end of the elongated compartment 19, and the other side constitutes a portion of the side wall of compartment 19 located adjacent the other end 23 of compartment 19 closed by the front wall 11. The front wall 11 includes a removable access plate 24 for closing the end 23 of compartment 19 and to permit the opening of the end 23 of compartment 19 when desired. The lower portion 10 is closed by a cover 25 which may be sealed to the base portion 10 by means of removable sealing tape 26.

The "B" battery is located within the elongated compartment 19 and comprises a plurality of individual cells 30, the cells being series-connected and forming a battery of the desired voltage. The "A" battery is located within the compartment 11 and is likewise comprised of a plurality of cells 31 series-connected and providing a battery of the desired voltage. In the instant case the "A" battery may be a 6-volt battery with an end cell 32 having a 1.5-volt tap, and the "B" battery may have a voltage of 120 volts.

Figure 6:
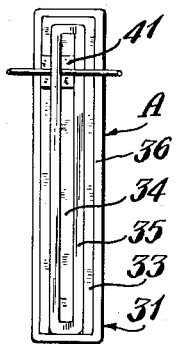
Fig. 6 is a plan view of an individual cell of the "A" battery.
Figure 4:
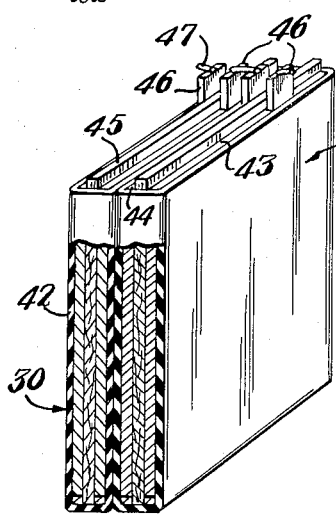
Fig. 4 is a perspective view with portions cut away showing the cell construction of the "B" battery.
Figure 3:
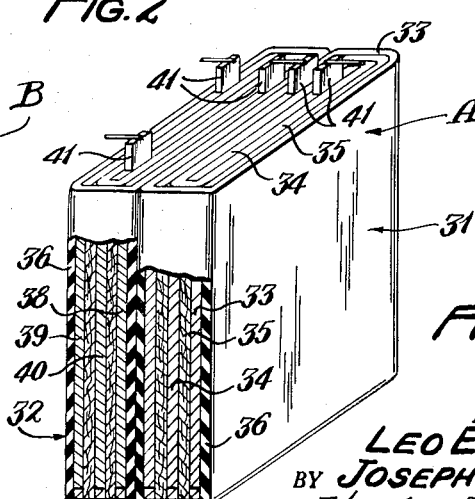
Fig. 3 is a perspective view with portions cut away showing the cell construction of the "A" battery.

The structure of the individual cells 31 of the "A" battery and the end cell 32 is illustrated in Fig. 3. Referring to Fig. 3 and also Fig. 6 of the drawing, each cell 31 comprises a negative plate-like electrode, hereinafter referred to as negative plate 33, of U-shaped cross-section, and a positive plate-like electrode, hereinafter referred to as positive plate 34, intermediate and parallel to the legs of the U-shaped negative plate 33. The positive plate 34 is wrapped with a separator 35, which may be of regenerated cellulose or a highly absorbent cotton fiber material such as that sold under the trade name "Webril." The positive plate may be a cuprous chloride plate having a thickness of approximately .070 inch, while the negative plate may be formed of magnesium having a thickness of approximately .016 inch. The separator is wound around the positive plate so that there is sufficient insulation intermediate the positive and negative plates and a thickness of .12 inch of separator intermediate the positive plate, and each leg of the negative plate has proved satisfactory. The separator 35 is permeable and is preferably adapted to absorb the electrolyte used with the battery.

Each cell 31 is within a bag or container 36 of impervious insulating material, thus preventing collection of electrolyte and moisture from shorting out cells of the battery. The bag 36 is open topped and preferably of a flexible plastic material such as polyethylene.

The "A" battery is comprised of four cells of the type described above, connected in series as shown in Fig. 1, and an end cell 32 to provide a voltage tap of 1.5 volts. The end cell comprises two positive plate-like electrodes, hereinafter referred to as positive plates 38, 39, within a plastic bag 36 like the bag of cell 31 and having a negative plate-like electrode, hereinafter referred to as the negative plate 40, located intermediate the positive plates 38, 39 and separated therefrom by a separator 35. The positive plate 38 is connected to the negative plate of the adjacent cell 31 of the "A" battery while the positive plate 39 is connected to the positive terminal for the 1.5-volt take-off. The negative plate 40 of cell 32 is connected to the negative terminal of the battery unit and constitutes the common negative for both the 6-volt tap and the 1.5-volt tap. All the electrodes of the "A" battery are provided with lugs 41 for making connection thereto.

The "B" battery is made up of a plurality of series-connected cells 30 each of which is located within an impervious container or bag 42 having an open top and is preferably of a flexible plastic such as polyethylene, as in the case of the bag or container 36 for the cells of the "A" battery. Each cell 30 of the "B" battery comprises a positive plate-like electrode 43, hereinafter referred to as a positive plate, and a negative plate-like electrode 44, hereinafter referred to as a negative plate, spaced from each other by a separator 45. The negative plate may be of magnesium and have a thickness of .016 inch, while the positive plate may be of cuprous chloride and have a thickness of approximately .035 inch. The separator intermediate the plates may be of regenerated cellulose or a highly absorbent cotton fiber material, as in the case of separator 35, and have a thickness of .070 inch. The positive and negative plates 43, 44 are each provided with a lug 46 which extends upwardly from the plate so that the cells may be conveniently connected in series by means of wire 47. The wire 47 is such as to permit relative movement between the individual cells of the "B" battery.

When the cells 30 of the "B" battery are connected in series, they form a string of cells with the plates of the battery located substantially transverse to the length of the string. The cells may be inserted into elongated compartment 19 by removing the plate 24 of the base portion 10 and shoving the cells endwise, i. e., longitudinally of the length of the string, into the compartment. The extent of compartment 19 is such that the cells are compressed tightly when in their final position with the plate 24 in place but leaving the expansion spaces 48 between the cells located adjacent the corners 15, 16, 17 of the base portion. Expansion spaces 48 permit the cells to expand with use. The above-described method of assembling the "B" battery provides an inexpensive and rapid method of inserting the cells about the central compartment of the casing.

Figure 2:
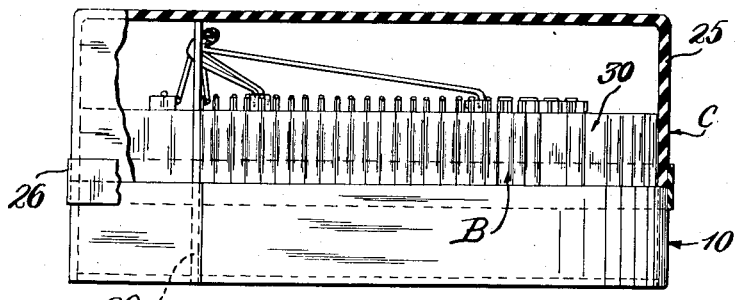
Fig. 2 is a front elevational view of the battery of Fig. 1 with the cover in place and a portion thereof broken away.
Figure 5:
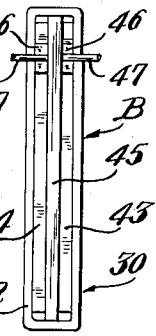
Fig. 5 is a plan view of an individual cell of the "B" battery.

After the "B" battery and "A" battery have been located within the casing 10, external connection may be made to the batteries and the cover 25 applied to the base portion, as illustrated in Fig. 2. As hereinbefore stated, the cover 38 is preferably taped about its connection with the casing so that moisture will be excluded from inside the battery casing.

External connection may be made to the "A" battery and the "B" battery by means of leads connected to the battery terminals and led out through the cover 25 and terminating in a socket 50. The socket 50 is provided with five terminals: two terminals for the "B" battery; a negative terminal for the "A" battery; a 6-volt tap for the "A" battery; and a 1.5-volt tap for the "A" battery. The length of the leads connecting the socket 50 to the battery is such to permit relative movement of the cover with respect to the base portion 10.

A battery may be constructed as above described having increased capacity and rated voltage per unit volume. It may be stored in a dry condition and activated merely by the removal of the top of the casing and addition of water to the cells. The separators 35, 45 will absorb the amount of water necessary for the operation of the battery, and the excess may be drained or shaken out of the battery.

From the foregoing, it will be apparent that the objects of the invention heretofore enumerated, and others, have been accomplished, and that there has been provided a novel and improved battery and battery unit, as well as method of making the same which facilitates the manufacture of batteries of the character referred to. While the preferred embodiment of the invention has been described with considerable detail, it is to be understood that the invention is not limited to the batteries or constructions shown; for example, the plates and separators may be made of materials other than those specified, and may be of different dimensions from those given in the specification. It is my intention to be limited only by the scope of the appended claims.

Having thus described our invention, we claim:

1. The method of manufacturing a battery unit comprising, providing a battery casing having a central compartment and a second compartment around the central compartment; locating a first battery centrally within said battery casing; assembling a plurality of cells forming a second battery into a string of cells; and positioning said string of cells in said casing and in the second compartment by moving the string of cells longitudinally of its length.

2. A battery unit comprising, a battery casing having a bottom and side walls defining a casing with at least one rounded corner along the intersection of two side walls; interior wall means within said casing defining a first compartment spaced from said two side walls and a second compartment intermediate said first compartment and said two side walls; and a plurality of battery cells each having positive and negative plate-like electrodes in said second compartment with the electrodes of each cell perpendicular to the adjacent side walls.

3. A battery unit comprising, a battery casing having a bottom and side wall defining a casing with at least one rounded corner along the intersection of two side walls; intermediate wall means within said casing defining a first compartment spaced from said two side walls and a second compartment intermediate said first compartment and said two side walls; a battery within said first battery compartment; and a plurality of battery cells each having positive and negative plate-like electrodes in said second compartment and interconnected to form a string with the electrodes of each cell perpendicular to the adjacent side walls and to the length of the string.

4. A battery unit comprising, a battery casing having a bottom and side wall defining a casing with at least one rounded corner along the intersection of two side walls; intermediate wall means within said casing defining a first compartment spaced from said two side walls and a second compartment intermediate said first compartment and said two side walls; a battery comprised of a plurality of series-connected cells in said first compartment; and a plurality of battery cells each having positive and negative plate-like electrodes in said second compartment and interconnected to form a string with the electrodes of each cell perpendicular to said side walls, each of said cells in said first and said second compartment being contained within an individual open-top container comprised of an impervious insulating material.

5. A battery unit comprising, a casing having a bottom and side walls; interior wall means generally parallel to said side walls located within said casing and defining a first battery compartment and an elongated second battery compartment intermediate said first compartment and said side walls, said elongated second compartment substantially encompassing said first compartment and having all corners intermediate its ends rounded; and a plurality of cells each having positive and negative plate-like electrodes in said second compartment with the electrodes of each cell perpendicular to the adjacent side wall of the casing and series connected to form a battery.

6. A battery unit comprising, a casing having a bottom and side walls; interior wall means parallel to said side walls and within said casing defining a first battery compartment and an elongated second battery compartment intermediate said first compartment and said side walls, said elongated second compartment substantially encompassing said first compartment and having all corners intermediate its ends rounded; a plurality of cells each having positive and negative plate-like electrodes in said second compartment with the plates of each cell perpendicular to the adjacent side wall of the casing and series connected to form a battery; and removable means closing one end of said second compartment whereby access may be had to the second compartment from outside of said casing.

References Cited in the file of this patent

UNITED STATES PATENTS

| | | |
|---|---|---|
| 2,594,712 | Andre | Apr. 29, 1952 |
| 2,632,782 | Coleman et al. | Mar. 24, 1953 |
| 2,632,783 | Coleman et al. | Mar. 24, 1953 |
| 2,640,865 | Brennan et al. | June 2, 1953 |
| 2,667,527 | Pucher | Jan. 26, 1954 |
| 2,668,868 | Nelson | Feb. 9, 1954 |